United States Patent
Roux

(10) Patent No.: US 9,656,767 B2
(45) Date of Patent: May 23, 2017

(54) AUTOMATIC BAG DROP METHOD AND SYSTEM

(71) Applicant: IER, Suresnes (FR)

(72) Inventor: Damien Roux, Paris (FR)

(73) Assignee: IER, Suresnes (FR)

( * ) Notice: Subject to any disclaimer, the term of this patent is extended or adjusted under 35 U.S.C. 154(b) by 134 days.

(21) Appl. No.: 14/428,726

(22) PCT Filed: Sep. 5, 2013

(86) PCT No.: PCT/EP2013/068354
§ 371 (c)(1),
(2) Date: Mar. 17, 2015

(87) PCT Pub. No.: WO2014/044543
PCT Pub. Date: Mar. 27, 2014

(65) Prior Publication Data
US 2015/0246735 A1    Sep. 3, 2015

(30) Foreign Application Priority Data

Sep. 18, 2012  (FR) ...................... 12 58738

(51) Int. Cl.
G06F 7/00 (2006.01)
B64F 1/36 (2017.01)
B65G 43/08 (2006.01)

(52) U.S. Cl.
CPC .............. *B64F 1/368* (2013.01); *B64F 1/366* (2013.01); *B65G 43/08* (2013.01)

(58) Field of Classification Search
USPC ....................................................... 700/227
See application file for complete search history.

(56) References Cited

U.S. PATENT DOCUMENTS

| 3,752,312 A * | 8/1973 | Soltanoff ................. G09F 3/14 209/3.3 |
| 4,832,203 A * | 5/1989 | Nozawa ................ B07C 5/3412 198/349 |
| 5,793,639 A | 8/1998 | Yamazaki |
| 6,607,066 B1 * | 8/2003 | Andersen ............. B65G 17/345 198/370.04 |
| 2004/0035928 A1 * | 2/2004 | Anderson ............... B64F 1/366 235/385 |
| 2004/0223663 A1 * | 11/2004 | Cato ................... G06K 7/10861 382/318 |

(Continued)

*Primary Examiner* — Kyle Logan
(74) *Attorney, Agent, or Firm* — Greer, Burns & Crain, Ltd.

(57) ABSTRACT

A system is provided for the automatic drop-off of at least one object on a conveyor belt for the purpose of the transport of the at least one object. The system includes:
- at least one apparatus for delimiting an area, called a drop-off area, allowing access to the conveyor belt and including at least one point of entry into the drop-off area and at least one point of exit from the drop-off area;
- at each point of entry into the drop-off area, at least one first reader, for reading an item of authorization data;
- in the drop-off area:
  - at least one second reader, for reading an item of authorization data;
  - at least one delivery apparatus for delivering a tag, of identification to be affixed to the object to be dropped; and
- at least one database which can be accessed by the readers.

16 Claims, 2 Drawing Sheets

(56) References Cited

U.S. PATENT DOCUMENTS

2007/0109127 A1* 5/2007 Johnson ................ B64F 1/368
                     340/572.1
2014/0089243 A1* 3/2014 Oppenheimer ......... G06F 21/50
                     706/46

* cited by examiner

AUTOMATIC BAG DROP METHOD AND SYSTEM

CROSS-REFERENCE TO RELATED APPLICATIONS

This application is a §371 application of International Application No. PCT/EP2013/068354 filed on Sep. 5, 2013, which is incorporated herein by reference in its entirety.

BACKGROUND

The present invention relates to an automatic method for the drop-off of objects for the purpose of the transport of said objects. It also relates to a system implementing this method.

The field of the invention is the field of the transport of objects and, more particularly, the field of air transport.

The invention can more particularly be implemented in locations such as airports, for bag drop by an air transport passenger for the purpose of transporting bags in the hold of an aircraft.

It can also be implemented in locations such as post offices for the drop-off of packages to be transported by a postal delivery service.

The early bag drop systems installed in airports comprise a main conveyor belt. Bags are placed on the main conveyor belt by handlers who transport these bags from a drop-off area to the main conveyor belt. Once placed on the main conveyor belt, bags are transported by the main conveyor belt to an area for loading bags into the aeroplane.

New-generation systems comprise, in addition to the main conveyor belt, conveyor belts called secondary conveyor belts, linking the drop-off area to the main conveyor belt and avoiding the need for handlers to transport bags from the drop-off area to the main conveyor belt. Bags are dropped on the secondary conveyor belts by authorized handlers, after the passengers' boarding cards have been verified.

These new-generation systems have been modified in order to allow bags to be dropped in an automated manner by users for the purpose, inter alia, of obtaining a more rapid bag drop. In order to do this, the loading area has been equipped with a terminal making it possible to verify the user's boarding card and his entitlement to carry a bag in the hold, and optionally to print an identification tag for his bag.

However, many airports are still equipped with the early bag drop systems: these systems comprise a main conveyor belt only, and no secondary conveyor belt. The bags dropped by users in the drop-off areas are loaded onto the main conveyor belt by handlers.

Equipping each of these airports with a new-generation bag drop system represents a high cost and a significant downtime. Moreover, existing airports do not always have sufficient space for installing secondary conveyor belts. In these airports it is therefore difficult and above all costly to install the existing automated systems.

The aim of the invention is to overcome the aforementioned drawbacks.

Another aim of the invention is to propose a bag drop method and system allowing bags to be dropped in a secure and automated manner directly onto the main conveyor belt, while being less costly than equipping existing sites with the early or second-generation systems described above.

SUMMARY

The invention makes it possible to achieve at least one of the aforementioned aims by an automatic bag drop method for at least one object onto a conveyor belt for the purpose of transporting said at least one object, at an area, called drop-off area, delimited and allowing access to said conveyor belt, said drop-off area comprising at least one point of entry and at least one point of exit, said method comprising, during the drop-off of at least one object by at least one user:

a phase, called drop-off area entry phase, comprising the following steps:
  reading, called first reading, of an item of said drop-off area access authorisation data, provided by said user, and
  when the read item of authorization data is valid, authorizing said user to enter said drop-off area; and a phase, called drop phase, comprising the following steps:
  reading, called second reading, of said item of authorisation data inside the drop-off area,
  if the authorization data read during the second reading is an item of data read previously during the first reading, creating and delivering a means, called a tag, of identification of said object, comprising at least one item of data relating to the transport and/or the identification of the object,
  affixing said identification tag to said object, and
  drop-off of said object on said conveyor belt by said user.

In the description which follows, the words "user" and "passenger" are understood to be equivalent, as are the words "object" and "bag".

Thus, the invention makes it possible to achieve automatic bag drop without having to equip existing installations with bulky and costly elements and without compromising transport security.

Moreover, by avoiding the presence of secondary conveyor belts, the invention makes it possible to optimize space in the site concerned, and to ensure a better throughput of objects, in particular of passengers in the case of air transport, and to limit the waiting time for object drop-off.

Of course, the conveyor belt remains inaccessible to passengers outside the bag drop-off area.

The method according to the invention can also comprise, prior to the drop-off at least one object on said conveyor belt, a step of defining a drop-off area as described. Such an area can be described by the installation of means marking out the area, such as barriers or other.

The step of tag creation can comprise a step of printing the at least one item of data onto a media and/or a step of writing the at least one item of data in digital form to a memory, such as an RFID chip, integrated in the tag.

Once the tag has been delivered, the user can place his bag on the conveyor belt himself. It is provided with a tag such that it may be correctly directed to the intended means of transport, in particular to the aeroplane, and security is sufficient inside the area to avoid an object/bag not belonging to an authorized user/passenger being loaded into the means of transport/aeroplane. An object/bag not equipped with a tag is left behind in the loading area as a matter of course.

In order to determine if the item of authorization data read during the second reading is an item of authorization data already read during the first reading, the method according to the invention can for example comprise, during the drop-off area entry phase, storing in a remote or local database the item of authorization data read during the first reading step and, during the drop-off phase, consulting this database and comparing the item of authorization data read during the second reading with the data stored in the database.

Advantageously, the item of authorization data can be written on a bar code boarding card or in digital form to a memory, such as an RFID chip integrated in this card which is read by the different readers.

In order to determine whether or not the item of authorization data is valid, after the first reading step, the drop-off area entry phase can comprise consulting a remote or local database. The drop-off area entry phase can thus comprise a step of comparing the read item of authorization data with an item of data stored in the database and relating to:
- a departure location, for example a departure location of a flight in the case of a bag transported by air,
- an arrival location, for example an arrival location of a flight in the case of a bag transported by air,
- a departure time, and/or
- an entitlement associated with a transport, for example the baggage allowance associated with a flight in the case of air transport.

The drop-off area entry phase can also comprise:
- a step of reading an item of identity data, for example reading an identification document, a number from an identification document, the user's biometric data, such as finger- or retinal prints, and
- a step of verifying the association of the read item of authorization data with the read item of identity data, the authorization to enter the drop-off area then also depending on the result of this verification step.

Such a verification makes it possible to ensure that the user arriving with the item of authorization data is in fact the person to whom this item of authorization data was delivered.

Such a verification can be performed by comparing the item of identity data with an item of data previously stored in a database and/or directly on the media, for example the boarding card, from which the item of authorization data is read.

The step of entering the drop-off area can also comprise an opening of a device controlling entry, such as a barrier or an arch, in the drop-off area.

Such a device can be controlled directly by the reading means performing the first reading or by a central server depending on the data communicated to it by the reading means performing the first reading and/or from the result of at least one other verification which is performed by the server itself, such as the correspondence between the read biometric data and those stored in a database.

The method according to the invention can also comprise a phase, called drop-off area exit phase, performed after the drop phase and comprising, in particular if the tag comprises a remotely readable data medium, such as an RFID chip:
- a step of detecting a tag delivered in the drop-off area and not affixed to an object before exit from the drop-off area, and
- a step of opening a device controlling the exit from the drop-off area, such as a barrier or an arch or a gate, if no tag is detected during the detection step.

Thus it is possible to detect the passenger(s) who has (have) exited with a tag that is not affixed to the object for which the tag has been delivered and who could therefore subsequently try to affix it to another, unchecked object, for example.

Such a detection can be performed by having available arches/gates for the detection of RFID tags and more generally, remotely-readable tags, at the point of exit.

According to an embodiment, the method can comprise:
- a step of recording, in association with the user, tags delivered to the user,
- a step of detecting the tags affixed to the objects passing along the conveyor belt,
- a step of changing the status of an item of data associated with the tag once the tag has been detected on the conveyor belt.

In other words, during the step of delivering each tag, a reference of the delivered tag can be written as a tag that has been delivered:
- either to an identification media from which the item of authorization data is read,
- or to a remote or local database, in association with the item of authorization data or an item of identification data of the user with whom the item of authorization data is associated.

Then, when each object is dropped on the conveyor belt, the tag reference is read by a reader, for example an arch/a gate through which the objects are transported by the conveyor belt or dropped on the conveyor belt, and each reference read is stored in a database as a dropped tag.

In this case, the detection step of the exit phase can comprise:
- a step of reading, called third reading, of an item of data relating to the user, and
- a step of verifying the status of tags stored in association with the user;

the step of opening a device for controlling the exit from the drop-off area being performed depending on the status of the tags and optionally on the result of the comparison of data relating to the weight and/or the dimensions of the objects to which the tags have been affixed.

In particular, the detection step can thus comprise, in this embodiment, and for at least one user wishing to leave the drop-off area, the following steps:
- a reading, called third reading, of the item of authorization data of the user,
- verification that all the tags stored as "delivered" are also stored as "dropped".

If so, the user is authorized. Otherwise, an appropriate processing step can be carried out.

The method according to the invention can also comprise a step of measurement and verification of a weight or a dimension of at least one object during the drop-off area entry phase or during the drop-off phase.

It is thus possible to verify that the object which will be transported, for example in an aeroplane, is in fact that which has been verified beforehand.

Advantageously, the measurement and verification step can comprise, for at least one object:
- before the drop-off step, a step of storing at least one item of data relating to a dimension or a weight of the object, in the tag which will be affixed to the object or in a database, and
- during/after the step of drop-off of the object on the conveyor belt:
  - a step of measuring a weight or a dimension of the object, and
  - a step of comparing said measured weight or said measured dimension with said stored item of weight or dimension data.

Advantageously, the authorization to exit the drop-off area by opening the control device can be given also depending on the result of this measurement or verification step.

According to another aspect of the invention, there is proposed an automatic drop system for at least one object on a conveyor belt for the purpose of the transport of said at least one object, said system comprising:

at least one means for delimiting an area, called drop-off area, allowing access to said conveyor belt and comprising at least one point of entry into said area and at least one point of exit from said area, at each point of entry into said drop-off area at least one means, called first reader, of reading an item of authorization data, in the drop-off area:

at least one means, called second reader, of reading an item of identification data, at least one means of delivering an identification means, called tag, to be affixed to the object to be dropped, and at least one database storing data relating to the user and/or to the object, which can be accessed by said readers, means of comparing data read by the first reader with data stored in the database and/or data read by the first reader with those read by the second reader.

The system according to the invention can also comprise, at each point of entry into the drop-off area, at least one means of controlling entry to said drop-off area.

The system according to the invention can also comprise, at each point of exit from the drop-off area:

at least one means of controlling the exit from said drop-off area, and at least one means, called third reader, of reading an item of data relating to the user, such as the item of authorization data;

the database also being accessible to said third reader.

At least one of the first, second or third readers, and in particular the second reader, can also be or comprise a means of writing, specifically printing or entering an item of digital data, onto the tag and/or on an identification media from which the item of authorization data is read.

The system according to the invention can also comprise at least one means of measuring a weight or a dimension of an object.

Advantageously, the system can also comprise at least one means of writing onto the tag and/or onto an identification media from which the item of authorization data is read, said writing means being in communication, at least indirectly, with the at least one weight or dimension measurement means, and/or the at least one means of delivering tags.

The system according to the invention is particularly suitable for automatic bag drop in an airport.

BRIEF DESCRIPTION OF THE DRAWING

Other advantages and characteristics of the invention will become apparent on examination of the detailed description of examples which are in no way limitative, and the attached diagrams, in which.

DETAILED DESCRIPTION

It is well understood that the embodiments that will be described hereinafter are in no way limitative. Variants of the invention can in particular be envisaged comprising only a selection of the features described below in isolation from the other described features, if this selection of features is sufficient to confer a technical advantage or to differentiate the invention with respect to the state of the prior art. This selection comprises at least one preferably functional feature without structural details, or with only a part of the structural details if this part alone is sufficient to confer a technical advantage or to differentiate the invention with respect to the state of the prior art.

In particular, all the described variants and embodiments can be combined if there is no objection to this combination from a technical point of view.

In the figures, the elements common to several figures retain the same references.

Figure 1:
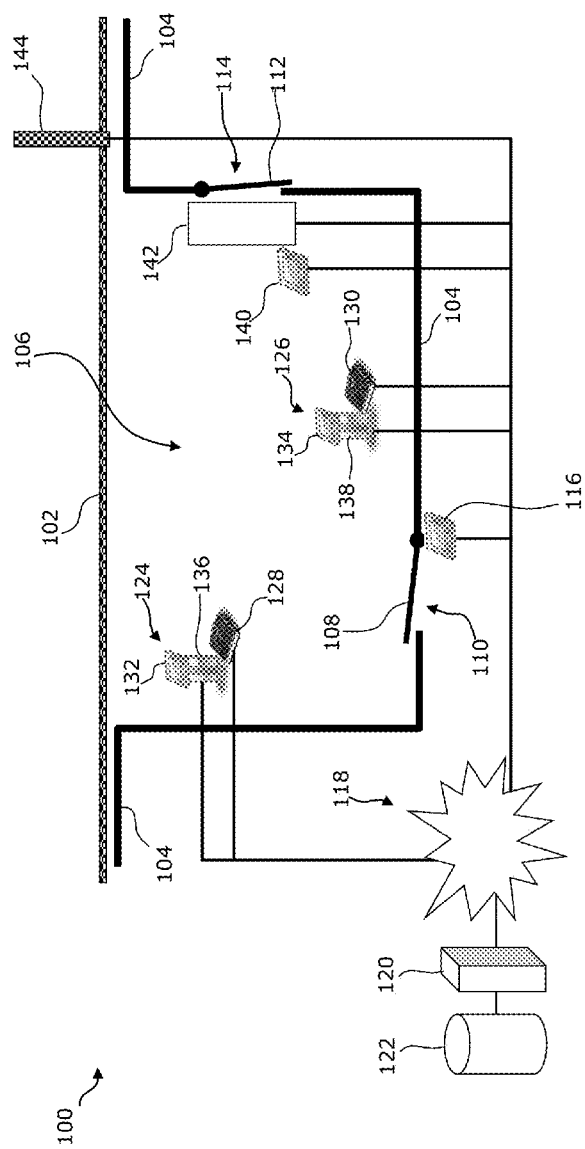
FIG. 1 is a diagrammatic representation of a system according to the invention.

FIG. 1 is a diagrammatic representation of a non-limitative embodiment of a system according to the invention The system 100 of FIG. 1 makes it possible to perform an automated bag drop in an airport comprising a conveyor belt 102 which transports the dropped-off bags to an area for loading bags into the hold of an aircraft.

The system comprises a set 104 of barriers which is bonded to the conveyor belt 102 in order to prevent any bags being dropped thereon, apart from within an area 106, called drop-off area, delimited by the set 104 of barriers and allowing access to the conveyor belt.

The system 100 comprises a device 108 for controlling passage, arranged at the entry 110 of the drop-off area 106 and a device 112 for controlling passage arranged at the exit 114 from the drop-off area 106.

Each device 108 and 112 for controlling passage can be an arch/gate or a barrier which can be moved by one or more motors (not shown) between a closed position preventing passage and an open position allowing passage.

Thus, in the open position, device 108 allows passage towards the drop-off area 106 from outside the drop-off area, and device 112 allows passage from the drop-off area 106 to outside the drop-off area 106.

Outside the drop-off area, adjacent to the entry 110, there is placed a reading device 116, called first reader, capable of reading an item of data authorizing access to the drop-off area 106 written on/in an identification medium.

The identification medium can be a boarding card with a bar code or RFID. When the boarding card has a bar code, the item of authorization data can be contained in or represented by the bar code of the boarding card. When the boarding card comprises an RFID card, the item of authorization data is written in a chip of the RFID boarding card.

The first reader 116 can optionally also read a means of identification written on/in an identity document of the passenger or biometric data of the passenger, such as for example by taking finger- or retinal prints.

The first reader 116 is linked, via a network 118, such as an internet network, to a local or remote central server 120 with which it is capable of communicating. The server 120 stores data relating to users, in the present example passengers, in a database 122. This server can itself be connected to other servers to validate passengers' entitlements.

The first reader 116 is linked to the device for controlling entry 108 which it controls depending on the results of the comparison between the data read from one or more identification media and data stored in the database 122 of the central server 120.

Inside the drop-off area 106, the system 100 also comprises two data processing terminals 124 and 126 each of which can optionally be associated with a loading device, respectively 128 and 130. Each data-processing terminal 124, 126 also comprises:

a reading device, respectively referenced 132 and 134, called second reader, of a means of identification such as a boarding card, and a printer, referenced respectively 136 and 138, for printing means of identification of bags, such as bag tags.

Each terminal 124, 126 is also capable of communicating with the central server 120 via the network 118.

Each loading device 128, 130 comprises at least one means of weighing the bags and optionally at least means of verifying the dimensions thereof.

Each loading device 128, 130 is linked to the corresponding terminal, respectively 124 and 126, which is capable of retrieving the values sent by the loading device 128 and 130, comparing with them with the authorized values stored locally or remotely, for example at the server 120 in the database 122. Printing the tag or other operations (passenger query, payment, etc.) can be commanded depending on the result of this comparison.

Each terminal 128 and 130 also comprises means of interaction (not shown) with the passenger such as a keyboard, a screen and optionally means of payment.

The system 100 also comprises a reading device 140, called third reader, arranged inside the drop-off area 106 at exit 114, which is identical to the first reader 116. This third reader is also linked to the server 120 via the network 118 and makes it possible to command the exit control device 112.

Facing the exit 114 from the drop-off area 106, the system 100 also comprises a device 142 for detecting means of identifying bags, such as RFID tags. This makes it possible to detect if a passenger attempts to exit the drop-off area 106 with a tag on his person. Light and/or audible warning means (not shown) can be provided for the case where a passenger is carrying a tag on his person.

The detecting device 142 is also linked to the server 120 by means of the network 118.

The system 100 comprises a tunnel 144 arranged above the conveyor belt 102 when the bags leave the area via the conveyor belt 102. This tunnel 144 comprises means of detecting tags and optionally reading the data present for example in the RFID chip when the tags are RFID tags. The tunnel 144 is also linked to the central server 120 via the communication network 118 and therefore to the database 122 in which are stored data relating to the bags and to the different elements of the system.

The tunnel 144 can also comprise means (not shown) of weighing and/or verifying the dimensions of bags.

Figure 2:
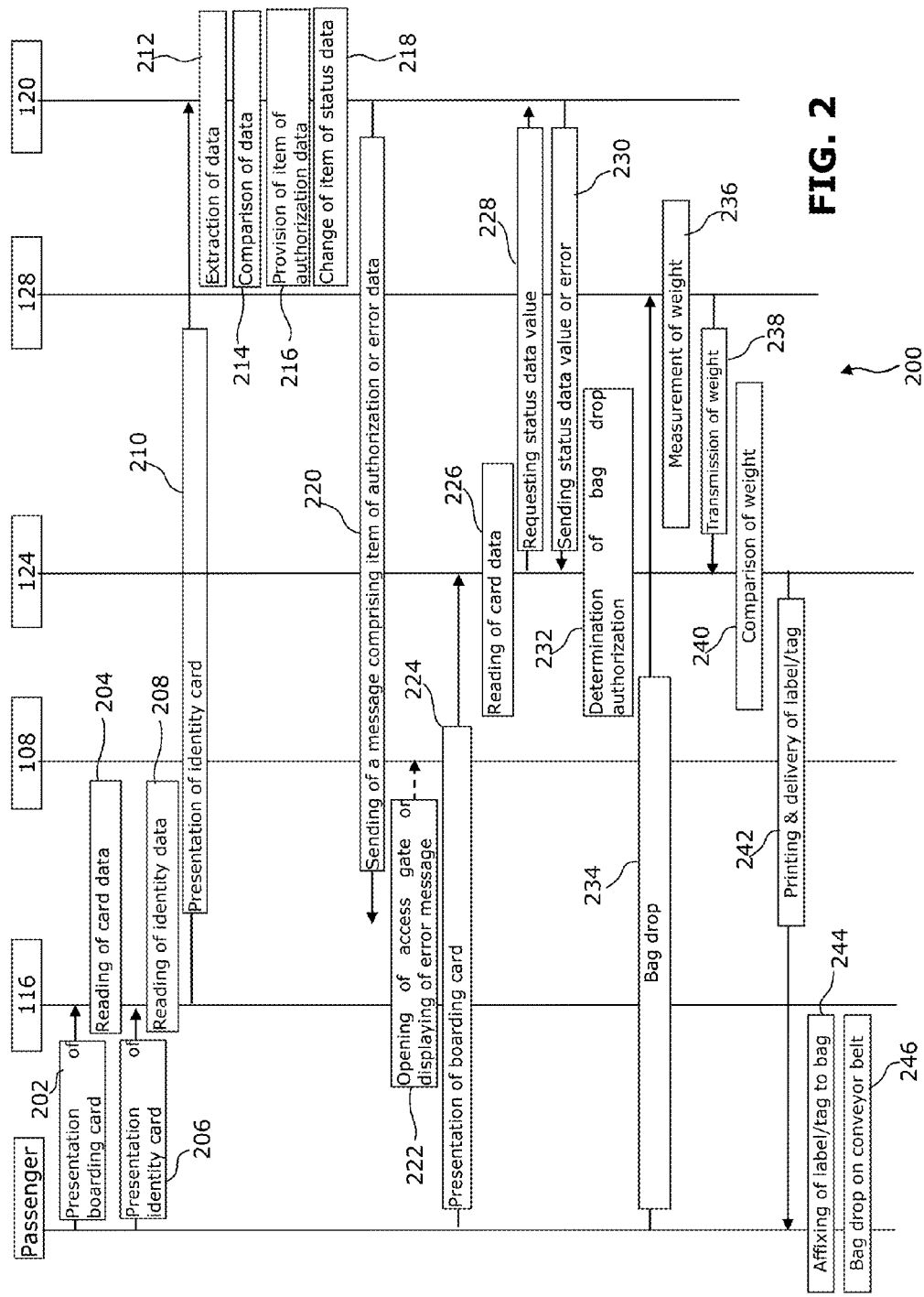
FIG. 2 is a diagrammatic representation of the steps of a method according to the invention.

FIG. 2 is a diagrammatic representation of an example of an automated method for the drop-off of objects for the purpose of their transport according to the invention.

The method 200 shown in FIG. 2 is described, more particularly, within the framework of automated bag drop by air transport passengers in an airport, and can be implemented by the system 100 in FIG. 1, without being limited to this system.

During a step 202, the passenger wishing to enter the secure drop-off area, for example drop-off area 106, presents his boarding card which comprises a bar code, at a first reader, for example the first reader 116.

During a step 204, the first reader reads the bar code. This bar code makes it possible for an identifier, which identifies the passenger, to be coded.

The method 200 can optionally comprise a step 206 during which the passenger presents an identity document at the first reader and a step 208 during which the first reader reads the data from the identity paper in order to obtain identity data or to obtain biometric data of the passenger (for example a fingerprint).

During a step 210, the first reader sends the data read during step 204, and optionally those read during step 208, to a remote central server, such as for example the server 120, via a communication network, such as for example the network 118.

During a step 212, the central server, using the passenger's identifier, extracts from a database, for example the database 122, the data stored with the received identifier. These data comprise data relating to the passenger's journey.

The central server compares, in step 214, the data received from the first reader with those extracted from the database and/or with predetermined data. The central server compares, for example, a departure location with an authorized departure location, a departure date with an authorized departure date, the flight time with a range of authorized times, or a flight number with a list of authorized flight numbers, also stored on the server, and verifies if the passenger has an authorization to place his bags in the hold.

In step 216, the central server provides an item of authorization data. When the data extracted correspond with the data read, the central server provides a granted authorization for the drop-off area, or otherwise, an item of refused authorization or error data.

During a step 218, the central server changes the status of an item of data associated with the boarding card in order to indicate whether or not the passenger has entered the drop-off area. An item of data marked "bags checked in?" can for example change from "0" to "1".

It is to be noted that this item of status data can also be tested before providing an item of authorization data in order, for example, not to allow the entry of a passenger where the bag check-in data shows that he has already been authorized to enter the secure drop-off area.

The central server transmits to the first reader a message comprising the item of authorization data or the error message during a step 220.

During a step 222, if the message received comprises an authorization granted data item, the first reader commands the opening of a device controlling entry to the drop-off area, such as for example the device 108, authorizing the entry of the passenger into the drop-off area. Otherwise, the error message received from the central server is displayed on a display screen of the reader.

Alternatively, the steps of comparing and providing authorization can be carried out at the first reader which will have previously retrieved information from the central server. It is to be noted that the step of obtaining identity data and comparing these data with extracted data is optional. Similarly, the data which are examined in order to provide authorization are indicated by way of example and other data or combinations of data could also be examined at this stage.

Once he/she is in the drop-off area, the passenger can thus go to a second reading means, for example the terminal 124, comprising a second reader 132.

During a step 224, the passenger presents his boarding card at the second reader located in the terminal 124.

The bar code, comprising the identifier of the passenger and optionally other data, is read by the terminal 124 during step 226.

The terminal requests from the central server the item of status data associated with the identifier which has just been read, during a step 228.

It is also possible to record the time at which the passenger entered the drop-off area and to verify that this time is not too far from the current time.

The item of data is communicated by the server to the terminal during a step 230.

If in the light of the item of status data it is evident that the passenger entered the area with the boarding card scanned at the first reader, in step 232 the data-processing terminal delivers an authorization to the passenger to drop off his bags.

Otherwise, an error message is displayed on a screen of the terminal. It is also possible to associate a warning with this error at the terminal, which for this purpose can be equipped with audible and/or light means.

If it was detected at the entry to the drop-off area, i.e. at the entry to the drop-off area during step 216 for example, that the passenger is not entitled to drop off a bag, it is thus possible to grant the passenger entitlement to enter the area in order to purchase an additional baggage entitlement at the terminal. In this case, an item of data relating to the drop-off a bag is additionally stored, for example during step 218. This item of data relating to the entitlement to drop off a bag is tested at the terminal, depending on the value of this item of data (if the passenger is not authorized to drop off the bag), a special purchase screen is displayed. The terminal can in this case be equipped with a bank card payment terminal for example.

If the passenger has authorization to drop off a bag, during a step 234, he places his bags one item at a time on a loading device capable of measuring the weight and optionally the dimensions of the bags, for example the loading device 128 of system 100.

Each bag is weighed, one item at a time, during a step 236. The dimensions of each bag are also verified.

The weight of each bag is communicated to the terminal by the loading device during a step 238.

During a step 240, the terminal compares the weight of each bag with one or more predetermined thresholds, optionally extracted at least partially from the central server and which can relate to the passenger (if, according to the status of the passenger, the weight of the bags which he is entitled to transport changes).

In the case where the weight and/or the dimensions of the bags do not comply, an error message is displayed on the data-processing terminal. It is also possible to allow the passenger to pay an additional charge to cover this eventuality or activate visual and/or audible warning means.

If the weight and the dimensions of each bag as measured are correct, during a step 242, the terminal equipped with a printer, for example the printer 136 of the system 100, prints a standard baggage tag.

The user then affixes the printed tag to the bag in question during a step 244.

She/He then drops the bags on the conveyor belt, for example the conveyor belt 102 in FIG. 1.

Once all his bags have been dropped on the conveyor belt, the passenger leaves the drop-off area, optionally after having again scanned his boarding card on a reading device, such as the third reader of the system 100 of FIG. 1.

In another alternative embodiment or in combination with the embodiment which has just been described, the printed tag comprises an RFID chip. When the passenger wishes to leave the secure drop-off area, he passes through a detector at the exit point, such as the detection device 142 of FIG. 1, intended to detect the RFID chips of the tags which the user is carrying on his person. If the user has tags on his person, the detector makes it possible to identify them and command the operation of means of visual and/or audible warning. In the case where such a detector is placed in front of a device controlling the exit from the drop-off area, such as the device 112 in FIG. 1, the third reader can also deactivate the command to open this device, preventing the exit of the passenger from the drop-off area.

In another alternative embodiment or capable of being combined with embodiment(s) already described, the conveyor belt is equipped with a tunnel such as the tunnel 144 in FIG. 1. At the moment of printing of the tag, a reference or an item of identification data of the RFID chip located in the printed tag is associated with the identifier of the boarding card, either at the central server, in this case these data are sent to the central server, for example in the form of a message, so that it combines an identifier from the RFID chip read before printing with the identifier of the boarding card, or by writing the identifier of the boarding card to the RFID chip. Other data can also be written to the RFID chip of the bags or at the remote server, such as for example weight and/or the dimensional data of the bags with which the tag is associated. The number of bags checked in with the boarding card is also written to the central server.

When the bags pass under the tunnel of the conveyor belt, the RFID chips of the bags are detected and their contents read. The tunnel can also verify the weight of the bags using scales placed beneath the conveyor belt and compare this weight with that written in the chip. If the weight of the bags does not correspond to that weighed during the step of printing the tag, an audible alarm can be triggered at the tunnel to put the bags on hold. The data measured and those checked in are compared locally at the tunnel or at the central server.

It is also possible to write to the central database that the bag with a predetermined identifier has actually passed onto the conveyor belt and that its weight did actually correspond to that of the bags checked in.

In this case, when the passenger wishes to exit the secure drop-off area, his boarding card is read using the third reader situated at the exit from the drop-off area. The third reader thus communicates with the central server in order to verify if all bags associated with the identifier of the boarding card which has just been read have actually been detected in the tunnel and if the weight of each bag corresponds to that weighed at the terminal.

If this is the case, the device commands the opening of the device controlling the exit, thus authorizing the passenger to exit the drop-off area. If this is not the case, the device controlling the exit remains closed and prevents exit from the drop-off area. A light and/or audible alarm is thus activated in order to warn an operator.

Of course, the invention is not limited to the examples that have just been described. In its simplest configuration, the system according to the invention does not comprise any checkpoint at the exit from the drop-off area. The identity data are also not necessarily scanned at entry. The number of data-processing terminals in the drop-off area is not limited to that which has been described. Similarly, the number of points of entry and exit is not limited to that which has been described and can be changed in order to facilitate the flow of passengers and limit the waiting time for drop-off of bags. The data-processing terminals described can have many functions other than those described (change of seat, payment of an additional charge, etc.). The loading device could also be linked to the first and not the second reader.

The invention claimed is:

1. A method for the automatic drop-off of at least one object on a conveyor belt for the purpose of transporting the at least one object to a drop-off area, and allowing access to the conveyor belt, the drop-off area comprising at least one point of entry and at least one point of exit, and the method comprising, during the drop-off of at least one object by at least one user:
- a drop-off area entry phase, comprising the following steps:
- reading, by a first reader at the drop-off area, access authorization data provided by the at least one user that is associated with the at least one object
- validating said authorization data; and
- authorizing the user to enter the drop-off area when the authorization data read by the first reader is valid; and
- a drop phase, comprising the following steps:
- reading, by a second reader, the authorization data of the at least one object in the drop-off area;
- comparing the authorization data read by the first reader and the authorization data read by the second reader;
- creating and delivering a tag for the at least one object when the authorization data read by the second reader matches the authorization data read by the first reader, the tag including identification information associated with the at least one object, the identification information comprising data relating to at least one of the transport and identification of the at least one object;
- affixing the tag to the at least one object; and
- placing the at least one object on the conveyor belt by the user.

2. The method according to claim 1, wherein the step of creating the tag comprises at least one of printing the identification information on a media device and writing the identification information in digital form to a memory device, such as an RFID chip, integrated in the tag.

3. The method according to claim 1, wherein the authorization data is written on a bar code boarding card or in digital form in a memory device, such as an RFID chip.

4. The method according to claim 1, wherein the phase of entry to the drop-off area comprises a step of comparing the read authorization data with an item of data relating to:
- a departure location, for example, a departure location of a flight transporting the at least one object by air;
- an arrival location, for example, an arrival location of a flight transporting the at least one object by air;
- a departure time; or
- an entitlement associated with a transport.

5. The method according to claim 1, wherein the phase of entering the drop-off area comprises:
- a step of reading identity data associated with the user; and
- a step of verifying the association of the read authorization data with the read identity data, the authorization to enter the area then also depending on the result of this verification step.

6. The method according to claim 1, wherein the authorization step comprises an opening of a device controlling entry into the drop-off area.

7. The method according to claim 1, further comprising:
- a step of recording, in association with the user, tags delivered to the user;
- a step of detecting tags affixed to objects passing along the conveyor belt; and
- a step of changing the status of the at least one object associated with the tag once the tag has been detected on the conveyor belt.

8. The method according to claim 1, further comprising a drop-off area exit phase, performed after the drop phase, and comprising, when the tag comprises a remotely readable data medium, such as an RFID chip:
- a step of detecting a tag delivered in the drop-off area and not affixed to the at least one object before exiting the drop-off area; and
- a step of opening a device for controlling the exit from the drop-off area when no tag is detected during the detection step.

9. The method according to claim 8, wherein the detecting step of the exit phase comprises:
- a step of reading an item of data relating to the user; and
- a step of verifying the status of tags stored in association with the user;
- the step of opening a device for controlling the exit from the drop-off area being performed depending on the status of the tags, and optionally, on the result of the comparison of previously determined data relating to at least one of a weight and dimensions of the objects to which the tags have been affixed.

10. The method according to claim 1, further comprising a step of measuring and verifying of a weight or a dimension of the at least one object during the drop-off area entry phase or during the drop-off of phase.

11. The method according to claim 10, wherein, for the at least one object, the step of measuring and verifying comprises:
- before the drop-off step, a step of storing at least one item of data relating to the dimension or the weight of the at least one object; and
- during or after the step of drop-off of the object on the conveyor belt:
- a step of measuring a weight or a dimension of the at least one object; and
- a step of comparing the measured weight or the measured dimension of the at least one object with a stored weight or dimension associated with the at least one object.

12. A system for the automatic drop-off of at least one object on a conveyor belt for the purpose of the transport of the at least one object, the system comprising:
- at least one means for delimiting a drop-off area, allowing access to the conveyor belt and comprising at least one point of entry into the drop-off area and at least one point of exit from the drop-off area;
- at least one first reader at each point of entry into the drop-off area, the at least one first reader configured for reading authorization data associated with the at least one object; and
- in the drop-off area:
- at least one second reader, configured for reading the authorization data;
- at least one means of creating and delivering a tag, including identification information, the tag to be affixed to the at least one object to be dropped off at the drop-off area;
- at least one database storing data relating to at least one of the user and the object, which can be accessed by the first reader and the second reader; and
- means of comparing data read by the first reader with data stored in the database or data read by the first reader with data read by the second reader.

13. The system according to claim 12, further comprising, at each point of exit from the drop-off area:
- at least one means of controlling the exit from the drop-off area; and at least one means, called a third reader, configured for reading the authorization data, wherein the database is accessible by the third reader.

14. The system according to claim 12, further comprising at least one means of measuring a weight or a dimension of the at least one object.

15. The system according to claim 12, further comprising means of writing, specifically printing or entering an item of digital data, onto the tag or on an identification media from which the item of authorization data is read.

16. An airport equipped with an automatic bag drop system according to claim 12.

* * * * *